United States Patent Office 3,379,439
Patented Apr. 23, 1968

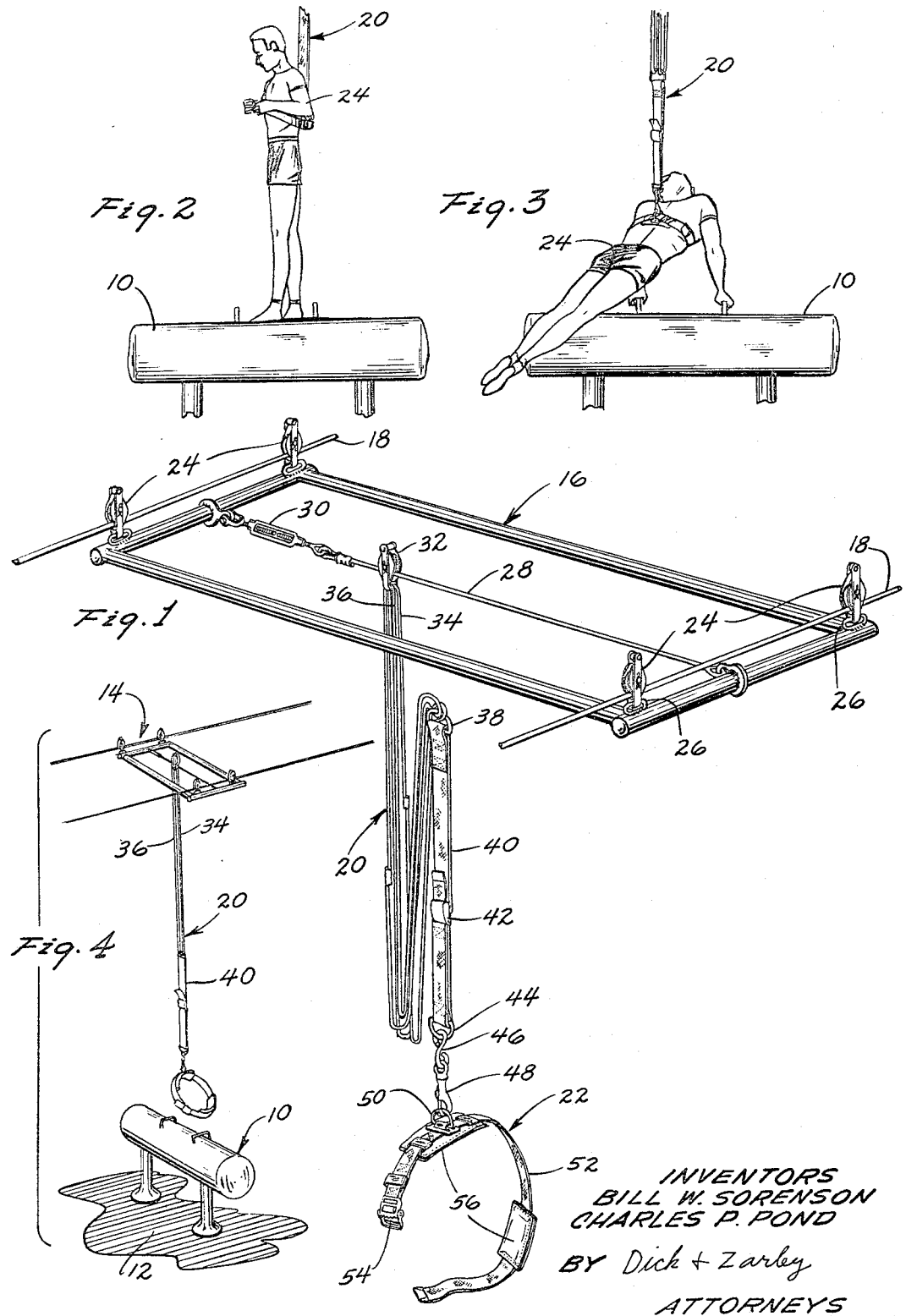

3,379,439
SIDE HORSE TRAINING DEVICE
Bill W. Sorenson, Jefferson, Iowa, and Charles P. Pond, Urbana, Ill., assignors to The American Athletic Equipment Co., Jefferson, Iowa, a corporation of Iowa
Filed Apr. 2, 1965, Ser. No. 445,044
8 Claims. (Cl. 272—64)

ABSTRACT OF THE DISCLOSURE

A training device including an elongated side horse positioned on a supporting surface, a pair of spaced apart elongated track members suspended above the side horse, a carrier assembly movably connected to the track members and movable lengthwise thereof, a track element mounted on the carrier assembly and extending substantially at right angles to the track members, a suspension system movably connected to the track element and movable along its length, and a belt assembly connected to the suspension system and adapted to be secured to a gymnast. The suspension system may be elastic and therefore extendable under the weight of the gymnast.

---

A side horse is particularly useful in exercising as it permits the gymnast to move to a multitude of different positions, over, on and around the side horse device thereby giving exercise to a large part of the human body. However, it is not always easy for the beginning gymnast to quickly learn the mechanics of difficult horse movements that call for tremendous strength. If a person attempts a horse movement but does not have the necessary strength or coordination to carry it through, he may fall and seriously hurt himself.

Therefore, one of the principal objects of this invention is to provide a side horse training device having a support means for the gymnast to assist him in performing the various maneuvers on the horse and prevent accidental injuries.

It is a further object of this invention to provide a horse device having a support system for the gymnast which gives the athlete almost complete freedom of movement over, around and on the side horse.

A still further object of this invention is to provide a support system which is adapted to move transversely and longitudinally of the side horse to give the gymnast substantially unlimited freedom of movement in the area of the horse.

A still further object of this invention is to provide a side horse having a support system including a suspension system which includes elastic means to yieldingly support the gymnast in exercising on the side horse.

A related object of this invention is to provide a suspension system which is adapted to be adjusted in length such that a belt assembly will normally engage the gymnast around his waist while standing on the side horse thereby facilitating the attachment and removal of the belt assembly and additionally providing support to the gymnast during the performance of various horse movements.

A further object of this invention is to provide a side horse training device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the complete support system ready for use;

FIG. 2 is a side elevational view illustrating the position the gymnast assumes when stepping into the belt assembly of the support system;

FIG. 3 is a side elevation view illustrating the gymnast performing horse movements wherein the support system is assisting in supporting his body over the side horse; and FIG. 4 is a perspective elevation view of the support system placed in its freely hanging position over the side horse and ready for use.

In FIG. 4 a side horse 10 is positioned on the floor 12 and a support system generally referred to by the reference numeral 14 is suspended thereabove.

The support system 14 as shown in FIG. 1 includes a carriage assembly 16 movable on a pair of horizontally disposed cables 18 while a suspension system 20 depends from the carriage 16. A belt assembly 22 is provided at the lower end of the suspension system 20 and is adapted to engage a gymnast 24 about his mid section as illustrated in FIGS. 2 and 3.

The pair of cables 18 may be secured in any convenient manner to the roof or ceiling structure of a gym or the like. The cables 18 should have sufficient length such that the carriage 16 will not be limited in its movement therealong as the gymnast moves from side to side over the horse 10 (FIG. 4).

As illustrated, the carriage assembly 16 is of tubular construction and rectangular in shape. A pair of sheaves 24 are pivotally connected to eye elements 26 to each of the corners of the frame. The sheaves 24 extend upwardly from the frame and are mounted on the cables 18. Intermediate the elongated sides of the frame of the carriage assembly 16, a tensioned cable 28 is provided which extends between the ends of the frame. A turnbuckle tightening device 30 is provided for varying the tension in the cable 28.

The suspension system 20 has a sheave 32 mounted on the cable 28 of the carriage 16. A pair of elastic cables are connected to the sheave 32 and form elongated individual endless loops 34 and 36. The loops 34 and 36 freely hang below the carriage assembly 16 and are connected at their lower ends to an eye member 38 on one end of a strap 40 formed into a loop and having an adjustable buckle fastener 42 for varying the length thereof. A second eye 44 is provided on the lower end of the strap 40 and connects through a S hook 46 a snap fastener 48 which is in turn removably connected to an eye element 50 carried on the belt assembly 22.

The belt assembly 22 includes a strap 52 for embracing the mid section of the gymnast 24 and is provided with an adjustable buckle fastener 54. A pair of pads 56 are disposed on the belt 52 for engagement with the back and front sides of the gymnast 24.

Thus, in use it is seen that the hore 10 is arranged in parallel relationship with the single cable 28 of the carriage 16 and consequently in transverse relationship to the pair of cables 18 forming a track for the carriage assembly 16. The adjustable strap 40 is positioned at the appropriate height for the gymnast 24 as seen in FIG. 2 by adjusting the buckle 42. After the belt 52 is placed around the gymnast 24 and locked by the buckle 54, the gymnast is ready to perform the horse movements as illustrated in FIG. 3. It is apparent that upon moving downwardly from the position of FIG. 2, tension will be placed on the elastic cables 34 and 36 and therefore the suspension system 20 will begin to assist the gymnast 24 in supporting his weight as he works out on the horse 10. The elasticity or strength of the elastic cables 34 and 36 may be varied as desired but it is to be appreciated that by the use of two separate cables 34 and 36 that if one should fail the other would continue to function and prevent accidental injury. As the gymnast 24 becomes more proficient in the horse movements, he will perhaps want to gradually lessen the tension in the suspension system 20 and eventually remove it completely after he has mastered the various exercises.

It is also to be appreciated that complete freedom of horizontal movement longitudinally and transversely of the horse 10 is permitted by the two-way movement of the supporting system 14 since the carriage assembly 16 may move transeversely of the horse 10 on the track cables 18 while the suspension system 20 may move longitudinally of the horse 10 on the cable 28 of the carriage 16.

Some changes may be made in the construction and arrangement of our Side Horse Training Device without departing from the real spirit and purpose of our invention, and it is our intention to cover by our claims, any modified forms of structure or use of mechanical equivalents which may be reasonably included within their scope.

We claim:
1. A side horse training device, comprising:
   an elongated side horse positioned on a supporting surface,
   a pair of spaced apart elongated track members suspended above said side horse,
   a carrier assembly movably connected to said track members and movable lengthwise thereof, a track element mounted on said carrier assembly and extending substantially at right angles to said track members,
   a suspension system movably connected to said track element and movable along its length, and
   a belt assembly connected to said suspension system and said belt assembly being adapted to be secured to a gymnast.
2. The device of claim 1 wherein said suspension system is elastic and therefore adapted to be extended under the weight of a gymnast.
3. A side horse training device, comprising:
   an elongated side horse positioned on a supporting surface,
   a pair of spaced apart elongated cable track members suspended above said side horse,
   a carrier assembly movably connected to said cable track members and movable lengthwise thereof, a cable track element mounted on said carrier assembly and extending substantially at right angles to said cable track members,
   a suspension system movably connected to said cable track element and movable along its length, and
   a belt assembly connected to said suspension system and said belt assembly being adapted to be secured to a gymnast.
4. The device of claim 3 wherein means is provided for varying the tension in said cable track members and said cable track element.
5. A side horse training device, comprising:
   an elongated side horse positioned on a supporting surface,
   an elevated support means,
   a pair of cable members suspended above said horse and connected to said support means, said cables being elongated and extending in a horizontal plane in spaced apart relationship,
   a horizontally disposed carrier assembly elongated in shape and having sheaves at each end thereof, said sheaves being mounted on the adjacent cables for movement of said carriage assembly therealong, a single cable extending lengthwise of said carrier assembly intermediate its sides,
   a suspension system having a sheave at one end in movable engagement with said single cable, said suspension system including elongated elastic members to permit extension of said system when placed under tension, and
   a belt assembly connected to the lower end of said suspension system and said belt assembly being adapted to be secured to a gymnast.
6. The device of claim 5 wherein said suspension system includes a pair of elastic cables and an adjustable strap member interconnected, and in turn said elastic cable and strap member interconnect said single cable to said belt assembly.
7. The device of claim 5 wherein said suspension system has a length such that when freely hanging over said side horse the belt assembly will be positioned above said side horse whereby the belt assembly will be approximately at the waist of a gymnast standing on the horse whereby said belt assembly may be secured to the gymnast.
8. A side horse training device, comprising:
   an elongated side horse positioned on a supporting surface,
   an elevated support means,
   a pair of cable members suspended above said side horse and connected to said support means, said cables being elongated and extending in a horizontal plane in spaced apart relationship,
   a horizontally disposed carrier assembly elongated in shape and having sheaves at each end thereof, said sheaves being mounted on the adjacent cables for movement of said carriage assembly therealong, a single cable extending lengthwise of said carrier assembly intermediate its sides,
   a suspension system having a sheave at one end in movable engagement with said single cable, said suspension system including elongated elastic members to permit extension of said system when placed under tension,
   a belt assembly connected to the lower end of said suspension system and said belt assembly being adapted to be secured to a gymnast,
   said side horse arranged in parallel relationship to said single cable member whereby a gymnast upon moving from side to side of said horse will move said carriage along said pair of cables and when moving lengthwise of said side horse will move said suspension system lengthwise of said carriage assembly thereby giving the gymnast substantially unlimited freedom of movement.

References Cited

UNITED STATES PATENTS

| Re. 25,843 | 8/1965 | Nissen et al. | 272—60 |
| 644,593 | 3/1900 | Gates | 35—29 |
| 943,174 | 12/1909 | Beard | 248—323 |

FOREIGN PATENTS 43,032  9/1930  Denmark.

ANTON O. OECHSLE, *Primary Examiner.*

M. R. PAGE, *Assistant Examiner.*